(12) United States Patent
Hutchinson et al.

(10) Patent No.: US 10,134,167 B2
(45) Date of Patent: Nov. 20, 2018

(54) USING CURVES TO EMULATE SOFT BODY DEFORMATION

(71) Applicant: DreamWorks Animation LLC, Glendale, CA (US)

(72) Inventors: Michael Hutchinson, Glendale, CA (US); Guido Zimmerman, Glendale, CA (US); Robert Helms, Glendale, CA (US)

(73) Assignee: DREAMWORKS ANIMATION LLC, Glendale, CA (US)

( * ) Notice: Subject to any disclaimer, the term of this patent is extended or adjusted under 35 U.S.C. 154(b) by 0 days.

(21) Appl. No.: 13/844,520

(22) Filed: Mar. 15, 2013

(65) Prior Publication Data
US 2014/0267252 A1   Sep. 18, 2014

(51) Int. Cl.
 G06T 13/20 (2011.01)
 G06T 19/00 (2011.01)
 G06T 19/20 (2011.01)

(52) U.S. Cl.
 CPC ............ *G06T 13/20* (2013.01); *G06T 19/20* (2013.01); *G06T 2219/2021* (2013.01)

(58) Field of Classification Search
 None
 See application file for complete search history.

(56) References Cited

U.S. PATENT DOCUMENTS

| 6,204,860 B1 * | 3/2001 | Singh ................. G06T 19/20 345/420 |
| 6,476,804 B1 | 11/2002 | Costabel |
| 6,822,653 B2 | 11/2004 | Boyd et al. |
| 7,307,633 B2 | 12/2007 | Anderson et al. |
| 7,450,126 B2 | 11/2008 | Marschner et al. |
| 7,545,379 B2 | 6/2009 | Xie et al. |
| 7,859,538 B2 | 12/2010 | Isner et al. |
| 8,139,068 B2 | 3/2012 | Isner et al. |

(Continued)

OTHER PUBLICATIONS

Maciej Matyka, How to Implement a Pressure Soft Body Model, 20040330, panoramix.*

(Continued)

*Primary Examiner* — Mark Zimmerman
*Assistant Examiner* — Yu-Jang Tswei
(74) *Attorney, Agent, or Firm* — Dentons US LLP (57) ABSTRACT

Using curves to emulate soft body deformation in a computer-generated character is disclosed. A method can include accessing a reference model mapped to one or more deformation curves for the character. The reference model can include a mesh of vertices representing a soft body layer of the character. The deformation curve can include multiple sample points selected for mapping. Each mesh vertex on the model can be mapped to each sample point on the curve to establish a relationship between them for deformation. The method can also include receiving a movement of one or more sample points on the curve to a desired deformation position. The method can further include calculating primary and secondary movements of the mesh vertices on the model based on the movements of sample points. The method can move the mesh vertices as calculated to a desired deformation position and output the reference model with the moved vertices for rendering to emulate the soft body deformation of the character.

22 Claims, 11 Drawing Sheets

(56) References Cited

U.S. PATENT DOCUMENTS

| | | |
|---|---|---|
| 2006/0017723 A1 | 1/2006 | Baran et al. |
| 2007/0133845 A1* | 6/2007 | Fradkin ............... G06T 7/0083 |
| | | 382/120 |
| 2008/0159608 A1 | 7/2008 | Suetens et al. |
| 2009/0195545 A1 | 8/2009 | Debevec et al. |
| 2010/0103170 A1* | 4/2010 | Baloch et al. ............... 345/420 |
| 2010/0156935 A1* | 6/2010 | Lim et al. .................... 345/647 |

OTHER PUBLICATIONS

"Additional Smooth Skin Binding Techniques", Maya® Character Creation: Modeling and Animation Controls, Chapter 4: Deforming the Skin, Additional Smooth Skin Binding Techniques, Sep. 11, 2003, 4 pages.

Chen et al., "Lattice-Based Skinning and Deformation for Real-Time Skeleton-Driven Animation", 12th International Conference on Computer-Aided Design and Computer Graphics (CAD/Graphics), Sep. 15-17, 2011, pp. 306-312.

Rhee et al., "Soft-tissue Deformation for In Vivo Volume Animation", 4 pages.

Yan et al., "Local Modification of Skin Surface Mesh: Towards Free-Form Skin Surface Deformation", Computational Geometry, Graphs and Applications, Lecture Notes in Computer Science, vol. 7033, 2011, pp. 195-205.

Extended European Search Report received for European Patent Application No. 14159902.7, dated May 9, 2014, 10 pages.

Rohmer et al., "Exact Volume Preserving Skinning with Shape Control", Proceedings of the 2009 ACM Siggraph/Eurographics Symposium on Computer Animation. SCA '09., Jan. 1, 2009, 10 pages.

Zhu et al., "3D Deformation Using Moving Least Squares", Tech. Rep. TR-10-07 Harvard University, Dec. 31, 2007, 5 pages.

\* cited by examiner

USING CURVES TO EMULATE SOFT BODY DEFORMATION

BACKGROUND

1. Field

The present disclosure relates to computer-generated animation and, more specifically, to using curves to emulate soft body deformation in computer-generated animation.

2. Related Art

In the field of computer animation, a computer-generated character is typically modeled using a skeleton structure that is covered with a soft body layer. An artist can achieve the visual effect of animation through movements of the bones and joints in the skeleton structure. The soft body layer moves, or deforms, in response to movements of the skeleton structure, through deformation of the skin, muscles, and soft tissue represented by the layer. Because the soft body layer of a computer-generated character is outwardly visible to viewers of the computer animation, it is important that the soft body deformation impart a visually plausible appearance of the computer-generated character.

However, in some cases, to achieve the visually plausible appearance, significant manual input by an artist is required to define the soft body deformation, which can be a time-consuming task. In other cases, the soft body deformation technique can be limited in its ability to achieve such an appearance. In still other cases, the soft body deformation technique can be computationally expensive to achieve this appearance.

Accordingly, there is a need for a soft body deformation technique that performs the deformation in a time- and computationally-efficient manner.

SUMMARY

This relates to using curves to emulate soft body deformation in a computer-generated character. A method can include accessing a reference model mapped to one or more deformation curves for the computer-generated character. The reference model can include a mesh of vertices representing a soft body layer of the character. The deformation curve can include multiple sample points selected for mapping. Each mesh vertex on the model can be mapped to each sample point on the curve to establish a relationship between them for deformation. The method can also include receiving a movement of one or more sample points on the curve to a desired deformation position. The method can further include calculating primary and secondary movements of the mesh vertices on the model based on the movements of the sample points. The method can move the mesh vertices as calculated to a desired deformation position and output the reference model with the moved vertices for rendering to emulate the soft body deformation of the character.

Several advantages can be realized with using curves to emulate soft body animation in a computer-generated character. The curves can provide significant deformation control with only a small number of sample points. The curves can target a small area of the character's soft body so as to provide fine grained deformation. The curves can provide a simpler deformation approach that substantially minimizes the inputs from the artist and the time the artist needs to perform the deformation.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

This relates to using curves to emulate soft body deformation in a computer-generated character. A method can include accessing a reference model mapped to one or more deformation curves for the character. The reference model can include a mesh of vertices representing a soft body layer of the character. The deformation curve can include multiple sample points selected for mapping. Each mesh vertex on the model can be mapped to each sample point on the curve to establish a relationship between the two for deformation. The method can also include receiving a movement of one or more sample points on the curve to a desired deformation position. The method can further include calculating primary and secondary movements of the mesh vertices on the model based on the movements of the sample points. The method can move the mesh vertices as calculated to a desired deformation position and output the reference model with the moved vertices for rendering to emulate the soft body deformation of the character.

Several advantages can be realized with using curves to emulate soft body animation in a computer-generated character. First, the curves can provide significant deformation control with only a small number of sample points. Second, the curves can target a small area of the character's soft body so as to provide fine grained deformation. Third, the curves can provide a simpler deformation approach that substantially minimizes the inputs from the artist and the time the artist needs to perform the deformation.

Although the description describes soft body deformation, it should be understood that the deformation can be applied to any object capable of being deformed, e.g., a sponge, an emulsion, paper, or the like.

Figure 1A:
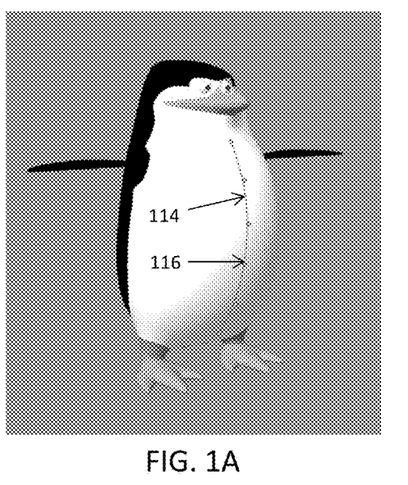
FIGS. 1A through 1D illustrate exemplary computer-generated characters from an animation that result from using curves to emulate soft body deformation.
Figure 1B:
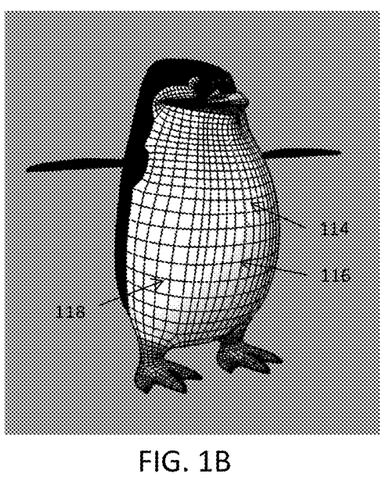
Figure 1C:
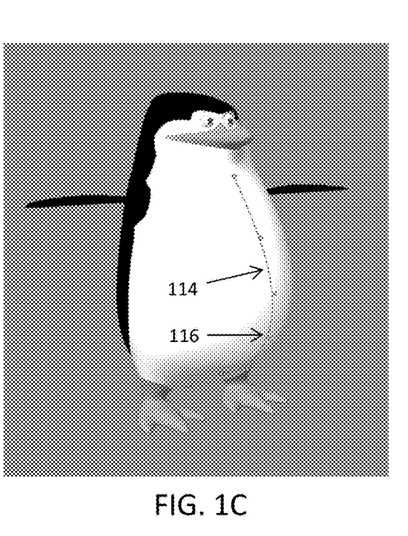
Figure 1D:
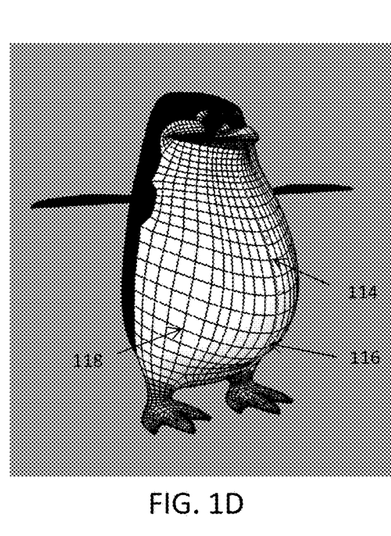

FIGS. 1A through 1D illustrate exemplary computer-generated characters from an animation rendered with the method for using curves to emulate soft body deformation as described in detail below. FIG. 1A illustrates a computer-generated character in a reference pose. In FIG. 1A, a deformation curve 114 with six points 116 is projected onto the character to show where the curve is located in the character's soft body reference model. FIG. 1B illustrates the character's soft body reference model mapped with the deformation curve of FIG. 1A. In FIG. 1B, a mesh reference model is shaped to the character's exterior to represent its soft body layer and the deformation curve with six sample points is projected onto the model. The mesh vertices 118 of the reference model are mapped to the six sample points 116 on the deformation curve 114 so that the movement, or deformation, of the mesh vertices can be controlled by the sample points. FIG. 1C illustrates the character of FIG. 1A after its abdomen has been deformed, using the soft body deformation method described herein. A comparison between the deformation curve 114 in FIGS. 1A and 1C show that curve point 116 (fourth point from the top) in FIG. 1C has been moved, or deformed, outward from the character's body, causing some of the other curve points (second, third, and fifth from the top) to similarly move, or deform, outward. The movement, or deformation, of the curve points has caused movement of portions of the abdomen corresponding to mapped mesh vertices in the reference model. FIG. 1D illustrates the deformed reference model of FIG. 1B. A comparison between mesh vertices 118 in FIGS. 1B and 1D shows that the mesh vertices corresponding to the abdomen have been moved, or deformed, outward, as controlled by the curve points (second, third, fourth, and fifth from the top). The mesh vertices' movements are in both the direction of the curve points' movement and the direction normal to the curve points' movement.

Figure 2:
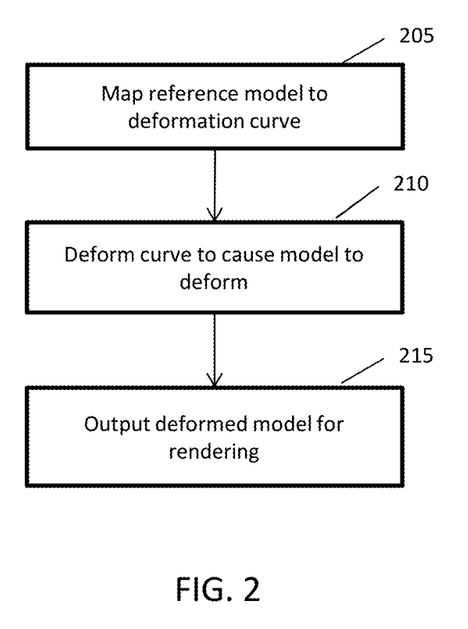
FIG. 2 illustrates an exemplary method for using curves to emulate soft body deformation in a computer-generated character.

FIG. 2 illustrates an exemplary method for using curves to emulate soft body deformation in a computer-generated character. In FIG. 2, one or more deformation curves can be mapped to a reference model of a computer-generated character, as shown in FIG. 1B (205). In some examples, the reference model can be a mesh shaped to the character's exterior to represent the character's soft body layer. In some examples, the curves can be B-spline curves mapped longitudinally onto the reference model. One or more of the curves can be deformed to cause the portions of the mesh mapped thereto to deform also, thereby creating a visually plausible appearance in the soft body layer, as shown in FIG. 1D (210). The deformed reference model can be outputted for rendering the character, as shown in FIG. 1C (215). The method will be described in detail below.

Figure 3A:
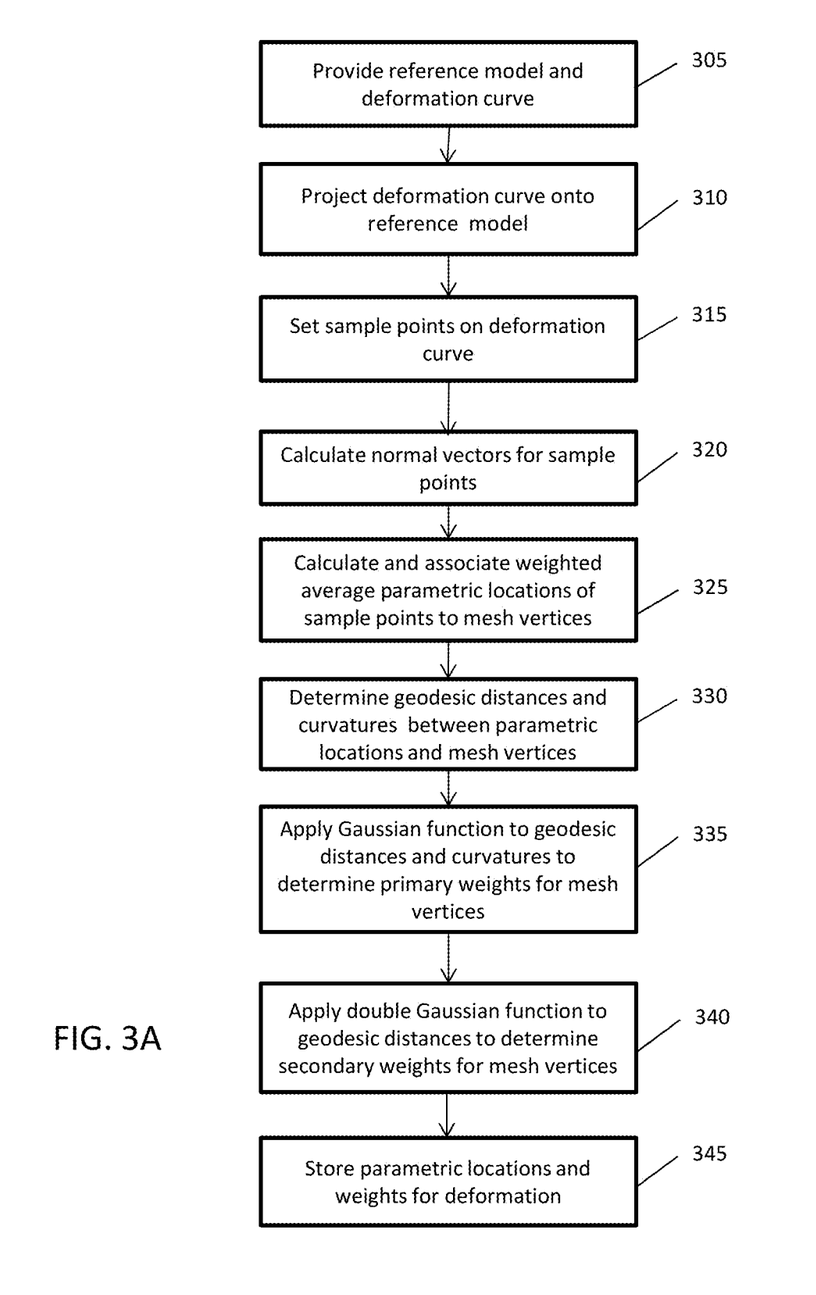
FIGS. 3A and 3B illustrate an exemplary method for creating a soft body model of a computer-generated character on which to use curves to emulate soft body deformation.
Figure 3B:
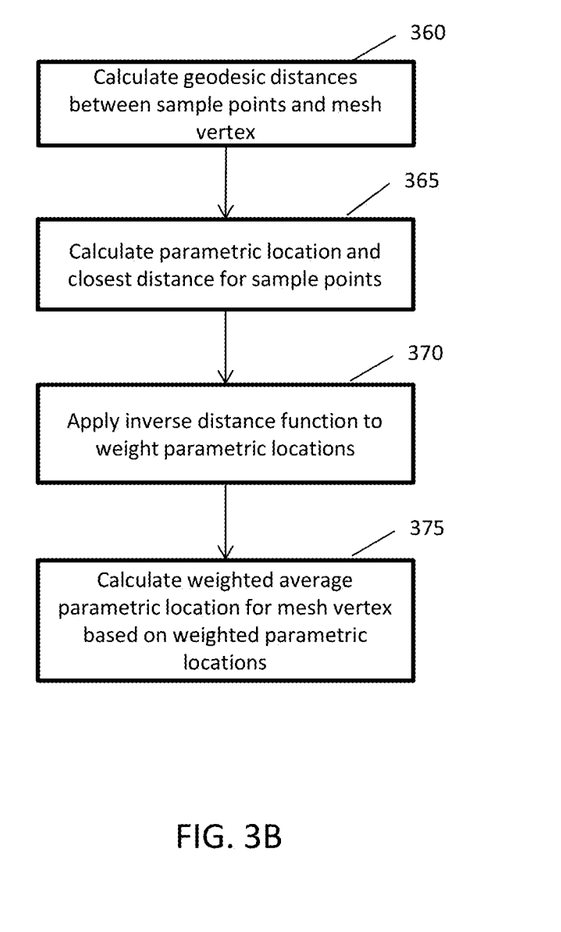

FIGS. 3A and 3B illustrate an exemplary method for mapping a reference model to one or more deformation curves, as described in FIG. 2. In FIG. 3A, a soft body reference model and one or more deformation curves can be provided (305). As stated above, the reference model can be a mesh shaped to represent a character's soft body layer. The deformation curves can be provided in a reference, or un-deformed, state. A deformation curve can be projected onto the surface geometry of the reference model to conform to the surface (310). As stated above, the deformation curve can be positioned longitudinally on the model surface. A number of sample points on the deformation curve can be set for mapping (315). In some examples, the number of sample points can be 50. The points can be spaced apart either the same or different distances along the curve. A vector normal to each sample point on the curve can also be calculated (320).

For each mesh vertex on the reference model, a weighted average parametric location on the curve can be calculated and associated with that mesh vertex (325). The association between the weighted average parametric location and the mesh vertex can effectively bind the mesh vertex to the curve such that, when the curve deforms, the mesh vertex deforms as well based on that parametric location. An exemplary method for calculating the weighted average parametric location is described below in FIG. 3B. For each mesh vertex, a geodesic distance and a geodesic curvature between the weighted average parametric location and that mesh vertex can be calculated (330). A geodesic curvature can be defined as a curvature between a sample point on the deformation curve and a mesh vertex on the reference model. For each mesh vertex, a Gaussian function can be applied to the calculated geodesic distance and geodesic curvature to determine a primary deformation weight for that mesh vertex relative to the curve (335). For each mesh vertex, a double Gaussian function can be applied to the calculated geodesic distance to determine a secondary deformation weight for that mesh vertex relative to the curve (340). A double Gaussian function can be defined as a Gaussian function multiplied by a quadratic function to provide a donut-shaped output. The primary and secondary weights can be used to calculate how much the mesh vertex deforms when the curve deforms, as described in detail below. For each mesh vertex, the weighted average parametric location and the primary and secondary weights can be stored for later use when performing a soft body deformation on the character (345).

As described above, the steps (325) through (345) can be repeated for each mesh vertex in the reference model to determine the weights of that mesh vertex relative to the deformation curve. Alternatively, the weighting can be limited to the mesh vertices that are within a proximate distance of the deformation curve.

The steps (310) through (345) can be repeated for each deformation curve to be mapped onto the reference model so that the curve can deform, thereby causing the reference model to deform also. In some examples, a single deformation curve can be used to deform the reference model.

FIG. 3B illustrates the calculation of the weighted average parametric location on a deformation curve relative to a mesh vertex (325), as described in FIG. 3A. It should be understood that the method of FIG. 3B can be repeated for each mesh vertex in the reference model. In FIG. 3B, at each sample point on the deformation curve, three geodesic distances can be determined: (a) a geodesic distance between the mesh vertex and that sample point; (b) a geodesic distance between the mesh vertex and another sample point adjacent to that sample point; and (c) a geodesic distance between that sample point and the adjacent sample point (360). At each sample point, the three geodesic distances can be used in trilateration to calculate a parametric location of that sample point and its closest distance to the mesh vertex (365). At each sample point, an inverse distance function can be applied to the calculated parametric location to weight that parametric location (370). After a weighted parametric location has been calculated for all the sample points on the curve, the weighted average parametric location can be calculated based on these weighted parametric locations (375). The method can then proceed to step (330) in FIG. 3A.

In an alternate example, rather than calculate geodesic distances, Euclidean distances can be calculated (325), (360). In another alternate example, rather than using a Gaussian function, a specific profile curve can be used to determine mesh vertex weights (335). In another alternate example, rather than using vector-based calculations to determine mesh vertex weights, affine transformations can be used to define translation, scaling, and rotation of mesh vertices when deformed (335), (340).

In some examples, the mapping can be a static process, where the reference model is mapped to one or more deformation curves pre-operation and then used repeatedly when performing soft body deformation on the character. In some examples, the mapping can be a dynamic process, where the reference model is mapped to one or more deformation curves as a first step in the soft body deformation.

Soft body deformation can include two types—primary deformation and secondary deformation. Primary deformation can involve the soft body movements that move, or deform, the soft body from its reference, or un-deformed, state to a deformed state. For example, movement from a flat abdomen (the reference state) to a concave abdomen (the deformed state) can contract the abdomen inward toward the body (primary deformation). Secondary deformation can involve the subsequent soft body movements that move, or deform, the soft body in other directions as a result of the primary deformation. Secondary deformation can emulate soft body volume preservation, where the soft body volume displaced by the primary deformation must be accommodated somewhere else on the soft body, so as to provide a visually plausible appearance. For example, the character's concave abdomen (primary deformation) may displace the character's soft body volume, thereby causing the character's sides, at the location of the deformed abdomen, to expand outward from the body (secondary deformation) to accommodate that volume.

Figure 4A:
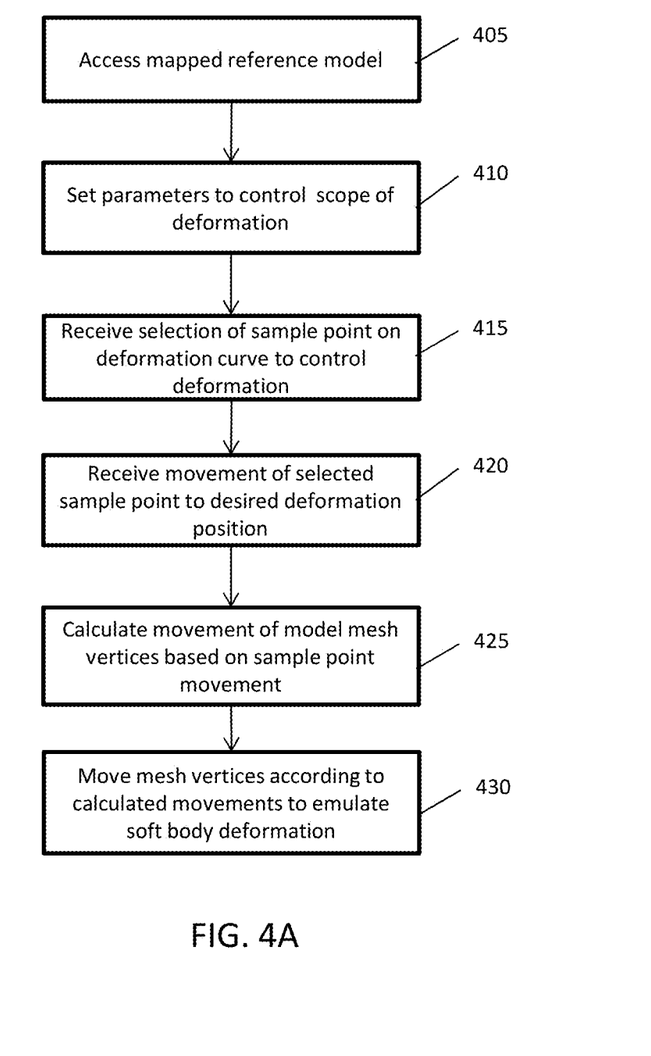
FIGS. 4A and 4B illustrate an exemplary method for using curves to emulate a primary soft body deformation in a computer-generated character.
Figure 4B:
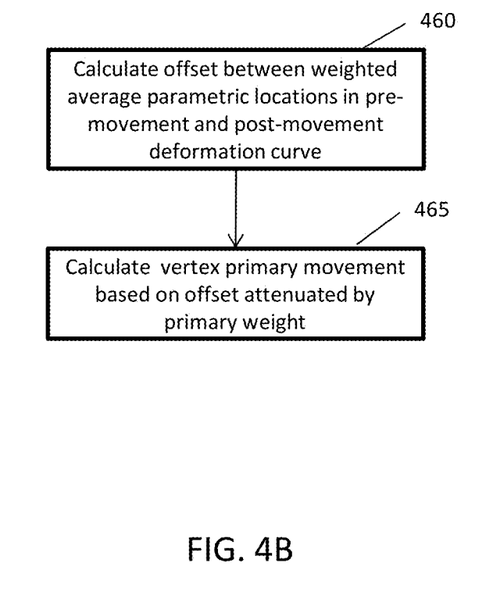

FIGS. 4A and 4B illustrate an exemplary method for using one or more deformation curves to emulate primary soft body deformation. In FIG. 4A, a reference model mapped with one or more deformation curves, as described in FIGS. 3A and 3B, can be accessed (405). Various parameters can be set to control the scope of the soft body deformation, i.e., how the deformation of the reference model will look (410). One exemplary parameter, a falloff distance, can be set to define a maximum geodesic distance from a sample point on a deformation curve. When the sample point is moved, or deformed, the falloff distance can constrain the mesh vertices that move, or deform, to only those within that distance. A smaller falloff distance can indicate a more localized deformation; whereas a larger falloff distance can indicate a broader deformation. A typical falloff distance is 10 units.

Another exemplary parameter, a falloff curvature, can be set to define a maximum geodesic curvature about a sample point on a deformation curve. When the sample point is moved, or deformed, the falloff curvature can constrain the mesh vertices that move, or deform, to only those within that curvature. A smaller falloff curvature can indicate a more isolated deformation, e.g., in a particular body area; whereas a larger falloff curvature can indicate a more far reaching deformation, e.g., in a first body area as well as an adjacent area that curves away from or around the first area. A typical falloff curvature is 135 degrees. This 135-degree curvature can isolate a character's front from its back and vice versa, such that a deformation of the character's abdomen does not cause a deformation of the character's lower back, for example.

The falloff distance and/or the falloff curvature can help define the Gaussian function used in weighing the reference model. As a result, when the falloff distance and/or the falloff curvature are set, the weights for each mesh vertex can be adjusted accordingly. Each mesh vertex can move with a curve, defined by the Gaussian function and determined by the weights, to provide a smooth deformation shape, or falloff, along the length of the deformation curve and the other directions away from the curve.

Next, a selection of one of the sample points on a deformation curve to control deformation can be received (415). In some examples, the selection can be received from a user. In some examples, the selection can be received from another algorithm. The sample point can coincide with a soft body location on the reference model to be deformed. A movement, or deformation, of the sample point from its original, or reference, position in the curve can be received (420). In some examples, the movement, or deformation, can be received based on a user's input. In some examples, the movement, or deformation, can be received based on another algorithm's input. In some examples, the sample point can be moved outward away from the reference model to emulate a bulge. The point can be moved in any direction and at any angle away from the model. In some examples, the sample point can be moved inward toward the reference model to emulate an indentation. The point can be moved in any direction or at any angle into the model. In some examples, the sample point can move along the plane of the reference model to emulate a shift. The point can be moved in any direction or at any angle within the plane of the model. Because the sample point is part of the deformation curve, its movement can cause the other sample points on the curve to move, or deform, along the same vector direction, to provide a smooth falloff along the curve.

Based on the movement, or deformation, of the sample points, the movement, or deformation, of the mesh vertices on the reference model can be calculated (425). An exemplary method for calculating the movement, or deformation, is described below in FIG. 4B. The mesh vertices on the reference model can then be moved, or deformed, by the calculated amount along the vector direction that the deformation curve moved (430).

FIG. 4B illustrates the calculation of the mesh vertices' movement, or deformation (425), as described in FIG. 4A. It should be understood that the method of FIG. 4B can be repeated for each mesh vertex in the reference model. In FIG. 4B, an offset can be calculated between the deformation curve pre-movement and the curve post-movement at the stored weighted average parametric location (460). In some examples, the offset can be a Euclidean offset. In some examples, the offset can be a full affine offset. The mesh vertex's movement can be the calculated offset attenuated by the stored primary deformation weight (465). The method can then proceed to step (430) in FIG. 4A.

Figure 5A:
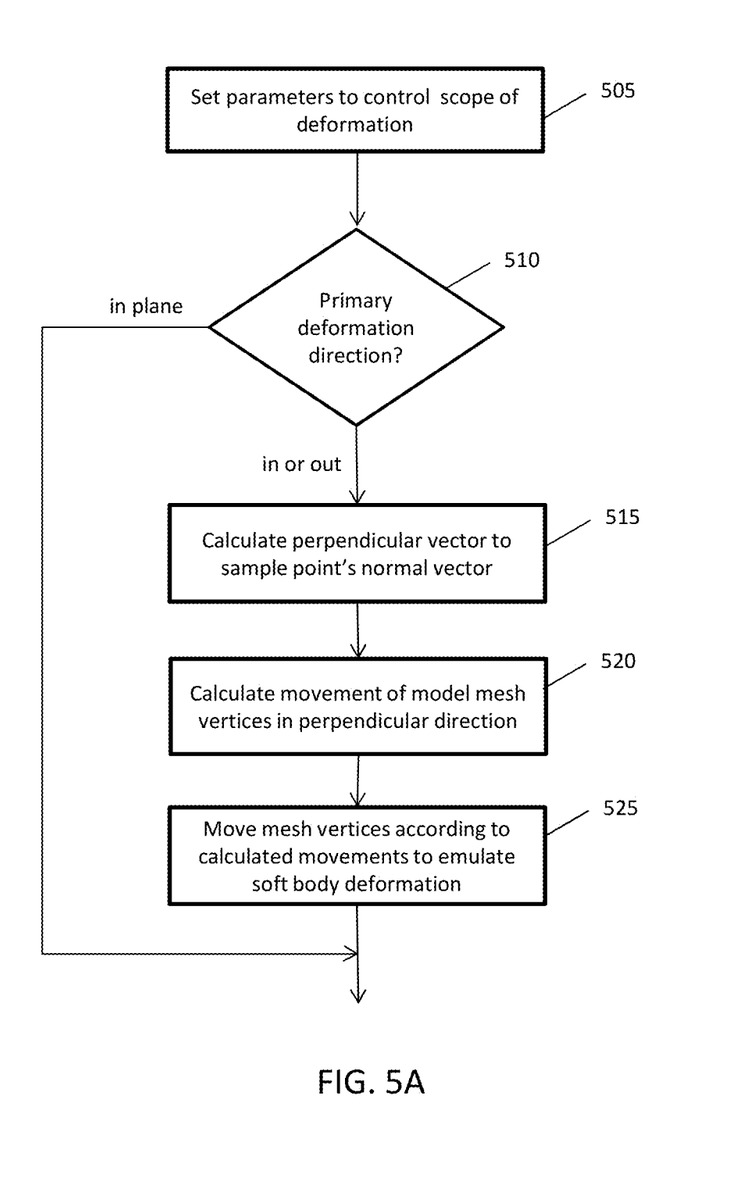
FIGS. 5A and 5B illustrate an exemplary method for using curves to emulate a secondary soft body deformation in a computer-generated character.
Figure 5B:
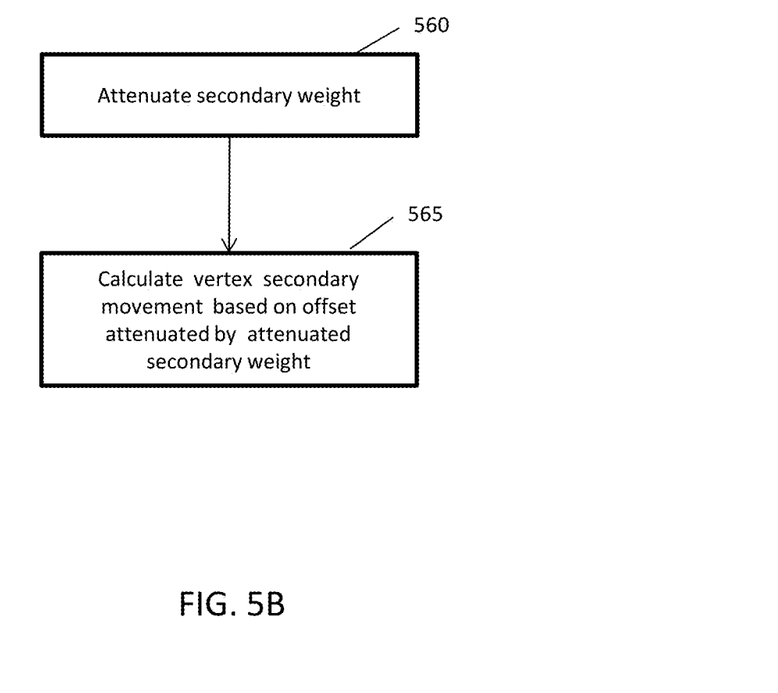

In addition to a primary deformation, a secondary deformation can occur as a result of the primary deformation. FIGS. 5A and 5B illustrate an exemplary method for using one or more deformation curves to emulate a secondary soft body deformation. In FIG. 5A, various parameters can be set to control the scope of the secondary soft body deformation of the reference model (505). As with the primary deformation, a falloff distance and a falloff curvature can be set for the secondary deformation. A determination can be made whether the primary deformation was in a direction either outward from or inward to the reference model (510). If the primary deformation was in an outward or inward direction (510), a secondary deformation can be done to emulate volume preservation for a visually plausible appearance.

As described above, a normal vector for each sample point on the deformation curve can be calculated during the reference model mapping. In FIG. 5A, a vector perpendicular to the normal vector of the sample point on the curve selected for primary deformation can be calculated (515). The perpendicular vector can be in a plane formed by the normal vector and a vector between the mesh vertex position and the sample point's pre-move, or pre-deform, position. Based on the movement, or deformation, of the sample points on the deformation curve, the movement, or deformation, of the mesh vertices along the perpendicular vector in the direction of the mesh vertices can be calculated (520). An exemplary method to calculate the movement, or deformation, is described below in FIG. 5B. The mesh vertices on the reference model can then be moved, or deformed, by the calculated amount along the perpendicular vector (525).

If the primary deformation was in-plane with the reference model (510), then secondary deformation can be omitted.

FIG. 3B illustrates the calculation of the mesh vertices' movement, or deformation (520), as described in FIG. 5A. It should be understood that the method of FIG. 5B can be repeated for each mesh vertex in the reference model. In FIG. 4B, the stored secondary deformation weight can be attenuated based on the alignment between the normal vector and the primary deformation vector and the alignment between the normal vector and the vector between the mesh vertex position and the sample point's pre-move, or pre-deform, position (560). The closer the alignment between the normal vector and the primary deformation vector, the lesser the attenuation of the weight. Similarly, the closer the alignment between the normal vector and the vector between the mesh vector position and the sample point's pre-move, or deform, position, the lesser the attenuation of the weight. The mesh vertex's movement can be the calculated offset (see step (460) in FIG. 4B) attenuated with the attenuated secondary deformation weight (565). The method can then proceed to step (525) in FIG. 5A.

Figure 6:
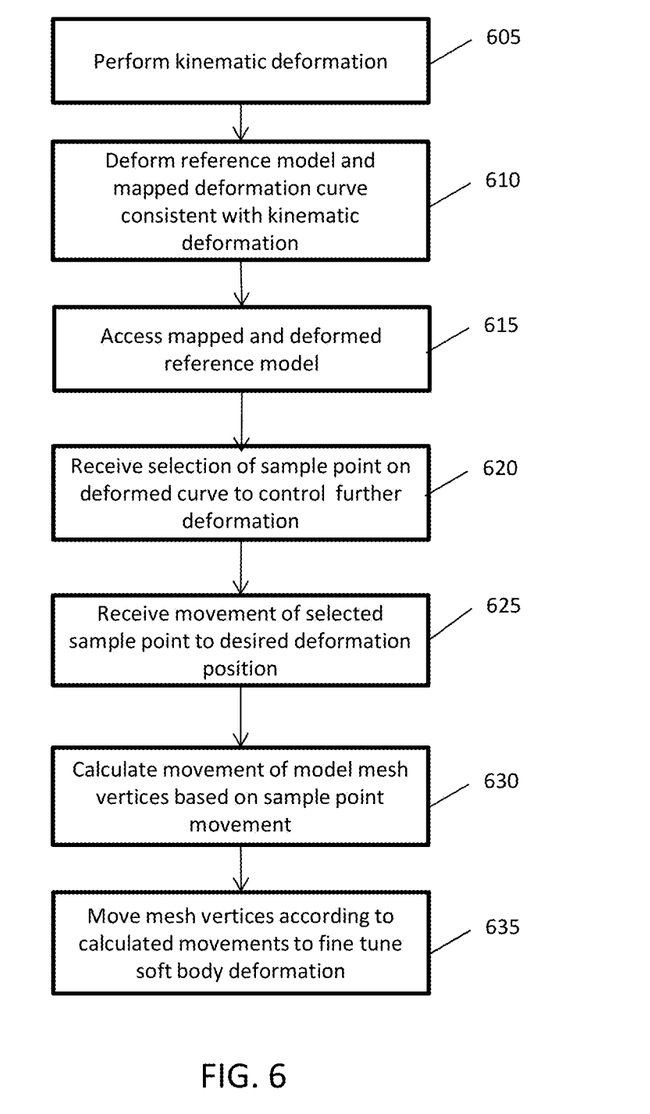
FIG. 6 illustrates an exemplary method for using curves to fine tune emulating a soft body deformation in a computer-generated character.

Kinematic deformations of a character's skeleton structure can cause the soft body layer to deform as well. In some cases, the resulting soft body deformation needs to be further deformed to provide a visually plausible appearance. FIG. 6 illustrates an exemplary method for using curves to fine tune a previous deformation. In FIG. 6, kinematic deformation can be performed on a computer-generated character (605). This can cause the reference model and the one or more deformation curves mapped thereto, as described in FIGS. 3A and 3B, to deform consistent with the kinematic deformation (610). The deformed model can be accessed (615). A selection of one of the sample points on a deformation curve to control further deformation can be received (620). A movement, or deformation, of the sample point from its kinematic deformation position in the curve can be received (625). The other sample points on the curve can be moved, or deformed, relative to the sample point's movement. Based on the movement, or deformation, of the sample points, the movement, or deformation, of the mesh vertices on the deformed reference model can be calculated (630). The movement, or deformation, can be calculated as described in FIGS. 4A, 4B, 5A, and 5B. The mesh vertices on the deformed reference model can then be further moved, or deformed, by the calculated amount along the vector that the deformation curve moved (635).

As an alternative to the direct movement of the deformation curve (620), other deformation techniques can be used, including but not limited to relaxation, sliding along the curve, and the like.

Figure 7A:
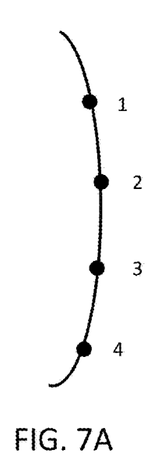
FIGS. 7A through 7C illustrate exemplary states of curves used to emulate soft body deformation in a computer-generated character.
Figure 7B:
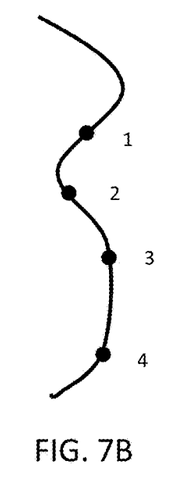
Figure 7C:
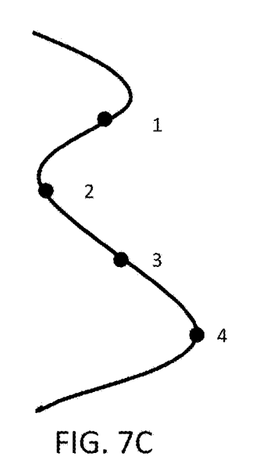

FIGS. 7A through 7C illustrate exemplary states of a deformation curve in FIG. 6. FIG. 7A illustrates a reference, or un-deformed, state of a deformation curve, having sample points 1 through 4. FIG. 7B illustrates the deformation curve of FIG. 7A after a kinematic deformation in which the character bowed forward and the soft body reference model contracted. The deformation curve at points 1, 2, and 3 deformed consistent with the kinematic deformation. FIG. 7C illustrates the deformation curve of FIG. 7B after a further soft body deformation to deform the reference model outward from the body. The deformation curve at point 4 was moved and the deformation curve at point 3 deformed in response.

It should be understood that soft body deformation is not limited to the methods of FIGS. 2 through 6, but can include other and/or additional steps capable of performing the deformation.

Figure 8:
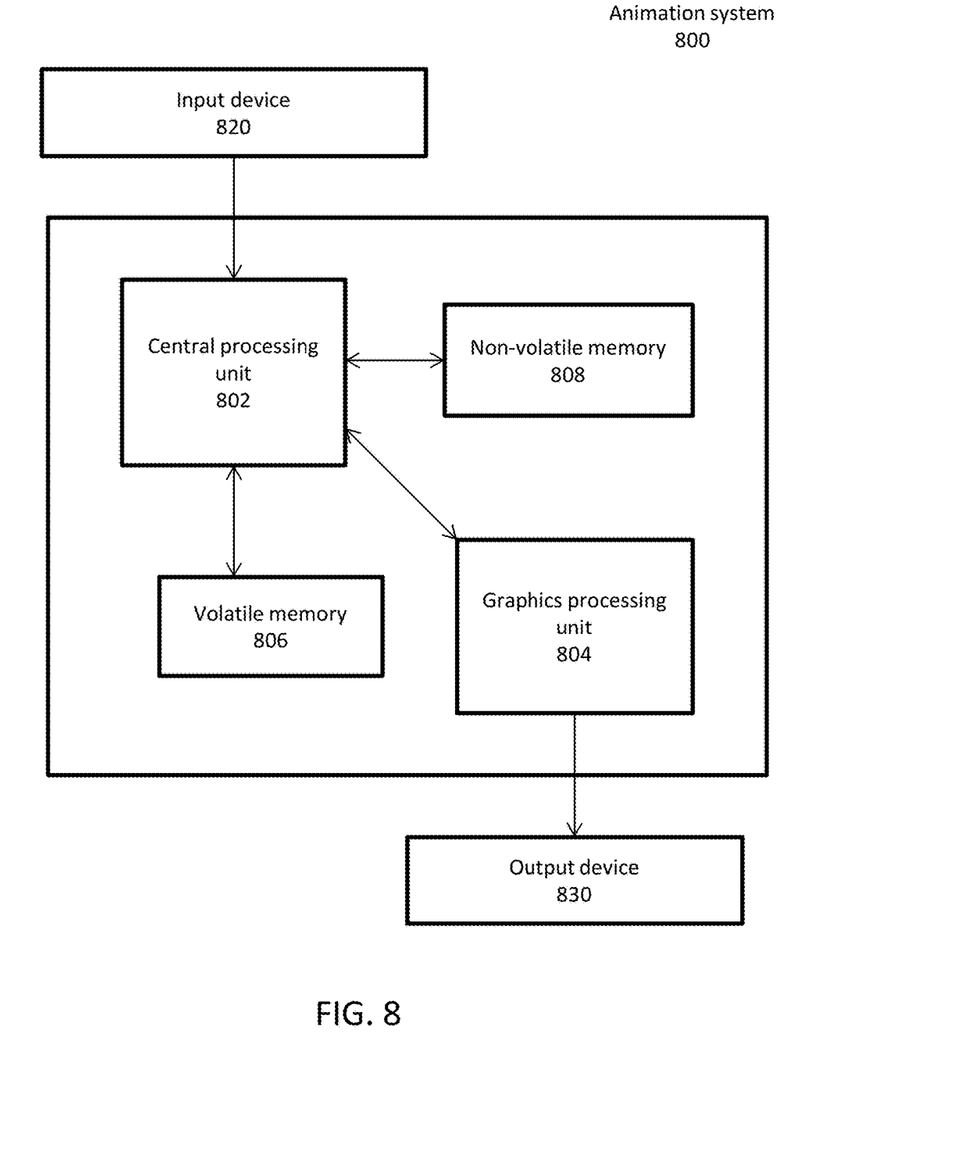
FIG. 8 illustrates an exemplary animation system that uses curves to emulate soft body deformation in a computer-generated character.

FIG. 8 illustrates an exemplary animation system 800 that can be used to emulate soft body deformation in a computer-generated character using curves, as described above. The soft body deformation can be implemented, for example, in either hardware or in software stored on a non-transitory computer-readable storage medium. The system can be configured to map curves to a reference soft body model and use the curves to emulate deformation on the soft body model. The system can be further configured to receive input from a user and to display graphics, an image, or scene of an animation based on the soft body deformation.

The animation system 800 can be configured to receive user input from an input device 820. The input device 820 can be any device that receives input from the user and transmits it to the animation system 800. For example, the input device can be a keyboard, a mouse, a tablet, a stylus, or the like. Those skilled in the art will recognize that other types of input devices can also be used.

The animation system 800 can be configured to output graphics, images, or scenes of an animation to a display device 830. The display device 830 can be any device that receives data from the animation system and presents it to the user. For example, the display device can be a liquid crystal display, a set of light emitting diodes, a projector, or the like. Those skilled in the art will recognize that other types of output devices can also be used.

The animation system 800 can comprise a central processing unit 802. The central processing unit can comprise one or more processing cores. The central processing unit 802 can be coupled to and able to communicate with the input device 820. Although the animation system 800 is illustrated with one central processing unit 802, the animation system 800 can have multiple processing units. The animation system 800 can also comprise a graphics processing unit 804. The graphics processing unit 804 can be dedicated to processing graphics related data. The graphics processing unit 804 can comprise a single processing core or multiple processing cores. Although the animation system 800 is illustrated with one graphics processing unit 804, the animation system 800 can have a plurality of graphics processing units. The central processing unit 802 and/or the graphics processing unit 804 can be coupled to and able to communicate data to the output device 830.

In one example, the animation system 800 can comprise one or more processors and instructions stored in a non-transitory computer readable storage medium, such as a memory or storage device, that when executed by the one or more processors, use curves to emulate soft body deformation, as described above. In the context of the embodiments described herein, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The animation system 800 can comprise volatile memory 806, which is a non-transitory computer readable storage medium, in communication with the central processing unit 802. The volatile memory 806 can be, for example, random access memory, such as dynamic random access memory or static random access memory, or any other type of volatile memory. The volatile memory 806 can be used to store data or instructions during the operation of the animation system 800. Those skilled in the art will recognize that other types of volatile memory can also be used.

The animation system 800 can also comprise non-volatile memory 808, which is a non-transitory computer readable storage medium, in communication with the central processing unit 802. The non-volatile memory 808 can include flash memory, hard disks, magnetic storage devices, read-only memory, or the like. The non-volatile memory 808 can be used to store animation data, render setup graph data, computer instructions, or any other information. Those skilled in the art will recognize that other types of non-volatile memory can also be used.

The animation system 800 is not limited to the devices, configurations, and functionalities described above. For example, although a single volatile memory 806, non-volatile memory 808, central processing unit 802, graphics processing unit 804, input device 820, and output device 830 are illustrated, a plurality of any of these devices can be implemented internal or external to the animation system 800. In addition, the animation system 800 can comprise a network access device for accessing information on a network, such as an internal network or the Internet. Those skilled in the art will recognize other configurations of the animation system 800 can be used.

Various exemplary embodiments are described herein. Reference is made to these examples in a non-limiting sense. They are provided to illustrate more broadly applicable aspects of the disclosed technology. Various changes can be made and equivalents can be substituted without departing from the true spirit and scope of the various embodiments. In addition, many modifications can be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which can be readily separated from or combined with the features of any of the other several embodiments without departing from the scope or spirit of the various embodiments.

What is claimed is:

1. A method for using curves to emulate soft body deformation in computer animation, the method comprising:
   accessing a reference model mapped to a deformation curve for a computer-generated character, the reference model including a mesh of vertices representing a soft body layer of the character and the deformation curve including a plurality of sample points, wherein each vertex of the model is mapped to each point of the curve;
   receiving a movement of at least one point on the curve;
   calculating a normal vector to the at least one point on the curve;
   calculating an offset between positions of the at least one point on the curve prior to and after the movement of the at least one point;
   calculating primary movements of the vertices of the model based on the calculated offset of the at least one point on the curve,
      wherein the primary movements are along a vector direction of the movement of the at least one point on the curve, and
      wherein the primary movements represent deformation of the reference model from a reference state to a deformed state;
   calculating secondary movements of the vertices of the model based on the calculated offset of the at least one point on the curve,
      wherein the secondary movement of a vertex is along a vector direction perpendicular to the normal vector and in a plane formed by the normal vector, the vertex's position, and the position of the at least one point on the curve prior to movement, and
      wherein the secondary movements represent subsequent deformation emulating soft body volume preservation as a result of the primary movements;
   moving the vertices of the model according to the calculated primary and secondary movements; and
   outputting the model with the moved vertices for rendering to emulate the soft body deformation of the character.

2. The method of claim 1, wherein calculating primary movements of the vertices comprises:
   weighing the calculated offset to determine the primary movements of the vertices.

3. The method of claim 1, wherein calculating secondary movements of the vertices comprises:
   weighing the calculated offset to determine the secondary movements of the vertices,
      wherein the secondary movements of the vertices are attenuated based on an alignment between the normal vector and at least one of (i) the vector direction of the movement of the at least one point on the curve and (ii) a vector between a position of a vertex and the position of the at least one point on the curve before movement.

4. The method of claim 1, wherein moving the vertices comprises:
   performing the primary movements of the vertices along a vector direction of the movement of the at least one point.

5. The method of claim 1, wherein moving the vertices comprises:
   performing the secondary movements of the vertices perpendicular to a vector direction of the movement of the at least one point.

6. The method of claim 1, further comprising:
receiving a second movement of the at least one point to fine tune to the movement of the at least one point.

7. The method of claim 1, further comprising:
performing the mapping of each vertex of the model to each point of the curve;
calculating a primary weight for each vertex relative to each point based on a geodesic distance and a geodesic curvature therebetween;
calculating a secondary weight for each vertex relative to each point based on the geodesic distance therebetween; and
using the calculated primary and secondary weights to calculate the respective primary and secondary movements of the vertices.

8. A non-transitory computer-readable storage medium comprising computer-executable instructions for using curves to emulate soft body deformation in computer animation, the computer-executable instructions comprising instructions for:
accessing a reference model mapped to a deformation curve for a computer-generated character, the reference model including a mesh of vertices representing a soft body layer of the character and the deformation curve including a plurality of sample points, wherein each vertex of the model is mapped to each point of the curve;
receiving a movement of at least one point on the curve;
calculating a normal vector to the at least one point on the curve;
calculating an offset between positions of the at least one point on the curve prior to and after the movement of the at least one point;
calculating primary movements of the vertices of the model based on the calculated offset of the at least one point on the curve,
wherein the primary movements are along a vector direction of the movement of the at least one point on the curve, and
wherein the primary movements represent deformation of the reference model from a reference state to a deformed state;
calculating secondary movements of the vertices of the model based on the calculated offset of the at least one point on the curve,
wherein the secondary movement of a vertex is along a vector direction perpendicular to the normal vector and in a plane formed by the normal vector, the vertex's position, and the position of the at least one point on the curve prior to movement, and
wherein the secondary movements represent subsequent deformation emulating soft body volume preservation as a result of the primary movements;
moving the vertices of the model according to the calculated primary and secondary movements; and
outputting the model with the moved vertices for rendering to emulate the soft body deformation of the character.

9. The computer-readable storage medium of claim 8, wherein calculating primary movements of the vertices comprises:
weighing the calculated offset to determine the primary movements of the vertices.

10. The computer-readable storage medium of claim 8, wherein calculating secondary movements of the vertices comprises:
weighing the calculated offset to determine the secondary movements of the vertices,
wherein the secondary movements of the vertices are attenuated based on an alignment between the normal vector and at least one of (i) the vector direction of the movement of the at least one point on the curve and (ii) a vector between a position of a vertex and the position of the at least one point on the curve before movement.

11. The computer-readable storage medium of claim 8, wherein moving the vertices comprises:
performing the primary movements of the vertices along a vector direction of the movement of the at least one point.

12. The computer-readable storage medium of claim 8, wherein moving the vertices comprises:
performing the secondary movements of the vertices perpendicular to a vector direction of the movement of the at least one point.

13. The computer-readable storage medium of claim 8, further comprising:
receiving a second movement of the at least one point to fine tune to the movement of the at least one point.

14. The computer-readable storage medium of claim 8, further comprising:
performing the mapping of each vertex of the model to each point of the curve;
calculating a primary weight for each vertex relative to each point based on a geodesic distance and a geodesic curvature therebetween;
calculating a secondary weight for each vertex relative to each point based on the geodesic distance therebetween; and
using the calculated primary and secondary weights to calculate the respective primary and secondary movements of the vertices.

15. An apparatus for using curves to emulate soft body deformation in computer animation, the apparatus comprising:
a memory configured to store data; and
a computer processor configured to:
access a reference model mapped to a deformation curve for a computer-generated character, the reference model including a mesh of vertices representing a soft body layer of the character and the deformation curve including a plurality of sample points, wherein each vertex of the model is mapped to each point of the curve,
receive a movement of at least one point on the curve,
calculate a normal vector to the at least one point on the curve,
calculate an offset between positions of the at least one point on the curve prior to and after the movement of the at least one point,
calculate primary movements of the vertices of the model based on the calculated offset of the at least one point on the curve,
wherein the primary movements are along a vector direction of the movement of the at least one point on the curve, and
wherein the primary movements represent deformation of the reference model from a reference state to a deformed state,
calculate secondary movements of the vertices of the model based on the calculated offset of the at least one point on the curve, wherein the secondary movement of a vertex is along a vector direction perpendicular to the normal vector and in a plane formed by the normal vector, the vertex's position, and the position of the at least one point on the curve prior to movement, and wherein the secondary movements represent subsequent deformation emulating soft body volume preservation as a result of the primary movements, move the vertices of the model according to the calculated primary and secondary movements, and output the model with the moved vertices for rendering to emulate the soft body deformation of the character.

16. The apparatus of claim 15, wherein the computer processor configured to calculate primary movements of the vertices:

weighs the calculated offset to determine the primary movements of the vertices.

17. The apparatus of claim 15, wherein the computer processor configured to calculate secondary movements of the vertices:

weighs the calculated offset to determine the secondary movements of the vertices, wherein the secondary movements of the vertices are attenuated based on an alignment between the normal vector and at least one of (i) the vector direction of the movement of the at least one point on the curve and (ii) a vector between a position of a vertex and the position of the at least one point on the curve before movement.

18. The apparatus of claim 15, wherein the computer processor configured to move the vertices:

performs the primary movements of the vertices along a vector direction of the movement of the at least one point.

19. The apparatus of claim 15, wherein the computer processor further configured to move the vertices:

performs the secondary movements of the vertices perpendicular to a vector direction of the movement of the at least one point.

20. The apparatus of claim 15, wherein the computer processor is further configured to:

receive a second movement of the at least one point to fine tune to the movement of the at least one point.

21. The apparatus of claim 15, wherein the computer processor is further configured to:

perform the mapping of each vertex of the model to each point of the curve;

calculate a primary weight for each vertex relative to each point based on a geodesic distance and a geodesic curvature therebetween;

calculate a secondary weight for each vertex relative to each point based on the geodesic distance therebetween; and use the calculated primary and secondary weights to calculate the respective primary and secondary movements of the vertices.

22. A method for using curves to emulate soft body deformation in computer animation, the method comprising:

accessing a reference model mapped to a deformation curve for a computer-generated character, the reference model including a mesh of vertices representing a soft body layer of the character and the deformation curve including a plurality of sample points, wherein each vertex of the model is mapped to each point of the curve;

receiving a deformation of at least one point on the curve;

calculating an offset between positions of the at least one point on the curve prior to and after the deformation of the at least one point;

performing a first deformation of the vertices of the model in a vector direction of the deformation of the at least one point, wherein the first deformation is based on the calculated offset, and wherein the first deformation represents deformation of the reference model from a reference state to a deformed state;

performing a second deformation of the vertices of the model in a perpendicular direction to the vector direction of the deformation of the at least one point, wherein the second deformation is based on the calculated offset, and wherein the second deformation represents subsequent deformation emulating soft body volume preservation as a result of the first deformation; and outputting the model including the first and second deformations for rendering to emulate the soft body deformation of the character.

* * * * *